Patented Mar. 16, 1943

2,313,759

UNITED STATES PATENT OFFICE 2,313,759

BITUMINOUS COMPOSITION AND METHOD OF MAKING THE SAME

Paul E. McCoy, San Francisco, Calif., assignor to American Bitumuls Company, San Francisco, Calif., a corporation of Delaware No Drawing. Application August 7, 1939, Serial No. 288,845

14 Claims. (Cl. 106—277)

This invention relates to bituminous materials useful for coating or covering various kinds of objects and to a composition comprising an object coated with a bituminous material, and, more particularly, to increasing or strengthening the bond or adhesion between a hydrophilic object and the bituminous material coated thereon, and thus obtaining a firmer and more permanent adhesion or bonding of the bituminous material to such object, especially in the presence of water, by the incorporation into the bituminous material of an agent effective for this purpose.

In the coating or covering of various objects with bituminous materials or bituminous compositions, such as asphalt, for example, it is found that the bituminous material does not readily coat many substances, or, if it does coat them, the bond or the adhesion between the bituminous material and the substance is too insecure to endure under conditions of use, especially in the presence of water, for a satisfactory length of time. This difficulty with respect to the bonding or adhesion between the bituminous material and the substance or object coated therewith has been found to be an especially troublesome problem when the substance to be coated is hydrophilic, that is, preferentially wetted by water. For example, in the making of asphaltic compositions by coating a mineral aggregate with a bituminous material, such as an asphalt, for the surfacing of highways, many aggregates are found to have a greater affinity for water than for the asphalt. Hence, even when such aggregate is coated with the bituminous material, water has a tendency to loosen and strip the bituminous coating from such aggregate, since the aggregate tends to become coated by the water for which it has a greater affinity. Thus it is apparent that the obtaining of a bond or adhesion of the bituminous material to hydrophilic aggregate which will be secure and permanent, especially in the presence of water, is a major problem the solution of which is of inestimable value to the highway building industry alone, not to mention the value to numerous other industries.

Attempts have been made heretofore to solve this problem. For example, it has been disclosed in the prior art that certain salts when used for treating the surface of the mineral aggregate are effective to strengthen the bond between the stone and the bitumen coated thereon against the effect of water. Such a prior art method involves treatment of the aggregate itself, which not only requires a relatively large quantity of the agent used but also has the disadvantage that the handling of the aggregate, which is a solid, in such treatment is a relatively cumbersome and difficult procedure as compared, for instance, to a procedure of treating something which is in substantially fluid form. Disclosures of other prior art attempts to solve this problem have suggested the use of certain salts in combination with a soap, but not only are such methods relatively unsatisfactory but also they have the readily apparent disadvantage of requiring two agents and depend on a relatively slow and relatively uncertain reaction therebetween.

The art relating to bituminous coating materials is replete with a multitude of kinds of bituminous materials and with bituminous materials treated with a very large number of different agents or substances for almost as many different purposes, but no indication appears teaching that any of these treated materials is suitable for coating hydrophilic substances, such as hydrophilic aggregate, to produce an aggregate coated with bituminous material, such as asphalt, having a bond strengthened against the deteriorating action of water.

Accordingly, it is an object of this invention to make a bituminous material, such as an asphalt, having a strengthened bond or adhesiveness for a hydrophilic object against the deteriorating action of water and to provide a process for making such a bituminous material.

It is another object of this invention to make a water-in-oil type of emulsion of bituminous material, such as asphalt, having a strengthened bond for a hydrophilic object and to provide a process for making such a bituminous material.

Another object of this invention is to make an asphalt composition comprising an object coated with a bituminous material, which asphalt composition has a bond between the bituminous material and even a hydrophilic object resistant to the deteriorating action of water.

Other and further important objects of this invention will become apparent from the description which follows and the appended claims.

I have now found that when a bituminous material, such as an asphalt, is treated, as by mixing, with aqueous solutions of certain salts substantially free of any soap, such as sodium or aluminum oleate, for example, it has the unexpected and unpredictable characteristics of producing directly a water-in-oil type of emulsion in which the asphalt is in the continuous phase and the aqueous solution in the disperse phase, and that when such a water-in-oil emulsion is applied to hydrophilic aggregate, it has the unexpected and unpredictable property of having an improved adhesiveness for such aggregate and the resulting coated aggregate is very much more resistant to the deteriorating action of water. Not only are these salts effective to strengthen the bond beween aggregate and bituminous material when the salt is used to treat the bituminous material in the form of an aqueous solution in such a manner that a water-in-oil type of emulsion is formed, but I have also found that the salts effective to strengthen the bond may be used to treat the bituminous material itself without water, as by mixing directly into the bituminous material in such a manner that the salt is dispersed therein without any water, and that when so added the resulting bituminous material gives a strengthened bond between the bituminous material and hydrophilic aggregate on which applied, which is especially resistant to the deteriorating effect of water.

Some of the salts used effectively in accordance with this invention have been disclosed, when used to pretreat the aggregate itself, to be agents effective to improve the bond between a silicious mineral aggregate and an asphalt. For example, United States Patent No. 2,089,713 discloses ferric chloride to be an agent effective to improve the bond between a silicious mineral aggregate and asphalt when the surface of the aggregate to be coated is first treated with the ferric chloride. It is a significant feature of this invention, however, that the agents of this invention effective to strengthen the bond between hydrophilic aggregate and the asphalt are added directly to the asphalt itself, and, when added thereto in aqueous solution, form a water-in-oil type of emulsion with the asphalt, and that when asphalts so treated are used to coat hydrophilic aggregate, the bond between the asphalt and the aggregate has a marked improvement in its resistance to the loosening and stripping effect of water, that is, the deteriorating action of water.

In the description which follows, my invention will be further explained by exemplifications and illustrations in terms of certain specific salts which are agents effective in accordance with my invention, but it is to be distinctly understood that although my invention includes the use of these specific agents in the novel combination of my invention, my invention, nevertheless, in a broader sense is directed to and contemplates the incorporation directly into the bituminous material itself of any agent, with or without some water, effective to strengthen the bond between a hydrophilic substance and the bituminous material, especially with respect to the resistance of such bond to the deteriorating effect of water.

*Example 1.*—A small proportion of an aqueous solution of ferric chloride ($FeCl_3.6H_2O$) was mixed into a quantity of RC—2 (see Table VI below) cutback consisting of about 70% of petroleum asphalt rendered liquid with about 30% of naphtha. Upon stirring for a few minutes it was found that the aqueous solution of ferric chloride mixed into the cutback and formed therewith a water-in-oil type emulsion. The resulting emulsion was used to coat a Louisiana gravel known to be hydrophilic, and this coated aggregate was allowed to cure for about forty-eight hours to remove a portion of the naphtha, whereupon it was tested to determine its water resisting properties. The test for the water resisting properties of the coating, hereinafter referred to as "the boiling water test," was made by immersing about 50 gm. of the coated aggregate in about 300 cc. of boiling distilled water for three minutes, during which time the coated aggregate and the boiling water were stirred somewhat vigorously. At the end of the three minutes the coated aggregate being tested was removed, and the proportion of aggregate remaining coated after this test was determined by an experienced operator by visual inspection. Tests were made in this manner on five different samples of this cutback containing different proportions of ferric chloride ($FeCl_3.6H_2O$) in solution, in each case, in 2% water based on the weight of the cutback and the results are given in the following table:

*Table I*

| Proportion of $FeCl_3.6H_2O$ by weight in cutback | Proportion of aggregate coated after test |
| --- | --- |
| | Per cent |
| 0.0% | 10 |
| 0.4% | 30 |
| 0.6% | 50 |
| 0.8% | 100 |
| 1.0% | 100 |

From the data appearing in Table I it is apparent that the optimum quantity of $FeCl_3.6H_2O$ by weight of the cut back to provide coated aggregate which will remain 100 per cent coated under the severe conditions of the boiling water test is about 0.8%. Since this test subjects the coated aggregate to conditions much more severe than usually would be encountered in actual practice, the proportion actually needed in practice for such work as highway surfacing, for example, may be lower, and it is found that as little as about 0.2% $FeCl_3.6H_2O$ will generally give satisfactory results and even less may be used when the conditions encountered are not severe, as, for example, when the aggregate is only mildly hydrophilic, but that from about 0.6% to about 1% is preferred, the larger proportion being used for the more hydrophilic aggregate. Still larger proportions may be used with effectiveness, but above about 3% it is found that the ferric chloride has an undesirable hardening effect on the asphalt and, therefore, the desirable range is from about 0.2% to about 3% $FeCl_3.6H_2O$ by weight of cutback treated. Obtaining adhesiveness without substantial hardening of the asphalt is a significant characteristic of this invention. The figures given in the foregoing are based on the ferric chloride when added as $FeCl_3.6H_2O$, since ferric chloride is most readily available on a commercial scale in this form. It is to be understood, however, that the ferric chloride as $FeCl_3$ without any water of hydration is the effective part of this salt, and therefore if this salt without the water hydration is used, a correction of the foregoing proportions must be made in accordance with the ratio of molecular weights of $FeCl_3$ and $FeCl_3.6H_2O$. Thus, although the preferred range of proportion of $FeCl_3.6H_2O$ is about 0.6% to about 1%, should anhydrous $FeCl_3$ be used the corresponding proportion range would be 0.36% to 0.60%.

When a water-in-oil type emulsion is formed, the water dispersed in the asphalt may be as high as about 50% by weight of the asphalt. Since it is found that increasing the proportion of water increases the viscosity of the emulsion, a large proportion of water may be used if a relatively viscous emulsion is desired and a small proportion of water if a less viscous emulsion is desired. The ferric chloride may be present alone in the cutback as, for example, when the ferric chloride in powder or crystal form is vigorously stirred into the cutback, or when the water of the water-in-oil type emulsion which is formed is driven off by heating, which may occur, for example, on heating the emulsion, or when an aqueous solution of ferric chloride is added to a heated asphalt. The asphalt or cutback may be warmed or heated if desired to render it more fluid to facilitate the incorporation of the salt.

When coating with a relatively hard asphalt rendered fluid by heating to above the boiling point of water, it is usually not desirable to have water present, because the steam engendered from such water causes the asphalt to froth or foam. For priming dirt roads a relatively fluid penetrating emulsion is desirable, and for this purpose from about 2 to about 10 per cent of water is found desirable. In a process in which the aggregate is hot and the emulsion relatively cool, from about 35 to 50 per cent of water is desirable to serve as bulk in the asphalt which has the effect of distributing the asphalt in a thin coating over the aggregate. The water also has a cooling effect on the hot aggregate as it is transformed into steam.

*Example 2.*—Antimony chloride ($SbCl_3$) was tested in the same manner as the ferric chloride in Example 1 above, except that Greenbrae stone chips, also known to be hydrophilic in character, were used instead of Louisiana gravel, and the results obtained are tabulated in the following table:

Table II

| Proportion of $SbCl_3$ by weight in cutback | Proportion of aggregate coated after test |
|---|---|
| | Per cent |
| 0.25% | 20 |
| 0.50% | 75 |
| 0.75% | 90 |
| 1.00% | 100 |
| 1.25% | 100 |

*Example 3.*—Lead acetate, $Pb(C_2H_3O_2)_2.3H_2O$, was tested in the same manner as the antimony chloride in Example 2 above, and the following results were obtained:

Table III

| Proportion of $Pb(C_2H_3O_2)_2.3H_2O$ by weight in cutback | Proportion of aggregate coated after test |
|---|---|
| | Per cent |
| 0.50% | 20 |
| 1.00% | 75 |
| 1.50% | 100 |

In order to determine the effectiveness of this invention on various type of aggregates known to be hydrophilic in character, a number of different aggregates were tested again using an RC-2 cutback containing 1% by weight of $FeCl_3.6H_2O$, and the results are shown in the following table:

Table IV

| Aggregate | | Proportion of aggregate coated after boiling water test | |
|---|---|---|---|
| Source | Character | No $FeCl_3.6H_2O$ | 1% $FeCl_3.6H_2O$ |
| | | Per cent | Per cent |
| Louisiana | Slick gravel | 10 | 100 |
| Greenbrae Quarry | Rock chips | 0 | 80 |
| Treasure Island | Dredged sand | 0 | 100 |
| Santa Rosa, N. M. | Asphalt sand | 10 | 100 |

From the results in Table IV above, it is apparent that this invention is effective when various type of aggregates are used. The aggregates selected above were known to be especially hydrophilic in character and, as appears from the results in Table IV above, by the application of this invention the deteriorating action of water on the coated aggregate is effectively reduced. It should be noted, however, that although the aggregates selected for test were very hydrophilic, this invention is not limited to such extremely hydrophilic aggregate but is useful on any aggregate substantially to the extent that it is hydrophilic.

Various types of asphaltic products were tested by adding thereto 1% of $FeCl_3.6H_2O$, and the results obtained are shown in the following table:

Table V

| Type of asphalt containing 1% $FeCl_3.6H_2O$ | Proportion of aggregate coated after boiling water test |
|---|---|
| | Per cent |
| RC-3 | 100 |
| L-2 asphalt | 95 |
| MC-3 | 100 |
| 60-70 road oil SC-2 | 100 |
| 102 Pen. Calol | 100 |
| Acid-free asphalt | 90 |

Characteristics of the cutbacks and asphalts used in the foregoing tests are given in the following table:

Table VI

| Designation | (60-70 road oil) SC-2 | MC-3 | RC-2 | RC-3 | (L-2 asphalt) 150/200 Calol | 102 Pen. 101/120 paving A. C. |
|---|---|---|---|---|---|---|
| General characteristics: | | | | | | |
| Water and sediment, percent | 2- | | | | 1- | |
| Flash point, °F | 200+ | 150+ | 80+ | 80+ | 450 | 450° |
| Furol viscosity at— | | | | | | |
| 77° F | | | | | | |
| 122° F | 200-300 | | 200-400 | | | |
| 140° F | | 300-500 | | 275-400 | | |
| 180° F | | | | | | |
| Float at 122° F | | | | | 250+ | |
| Pen. 77° F., 100 gm. 5 sec | | | | | | 101-120 |
| Loss on heating, 50 gm. 5 hrs. at 325° F | | | | | | 0.3% |
| Pen. of res. after heating | | | | | 125+ | 60% of orig. |
| Distill. percent by vol.: | | | | | | |
| Total distill. to— | | | | | | |
| 374° F | 2- | 2- | 10+ | 3+ | | |
| 437° F | 15- | 8-20 | 20+ | 14+ | | |
| 600° F | 25- | 25- | 35- | 30- | | |
| 680° F | | | | | | |
| Tests on res. from distill.: | | | | | | |
| Float at 122° F | 25+ | | | | | |
| Percent soluble in CS² | 99.0+ | 99.5+ | 99.5+ | 99.5+ | | |
| Pen. 77° F., 100 gm. 5 sec | | 100-300 | 60-120 | 60-120 | | |
| Duct. at 77° F | | 60+ | 60+ | 60+ | | 100+ |
| Percent 80 Pen. asphalt | | | | | 95+ | |
| Percent soluble in— | | | | | | |
| CS₂ | | | | | 99+ | 99.9+ |
| CCl₄ | | | | | 99.65+ | 99.9+ |
| Min. melting pt. (R. and B.) | | | | | | 100° F. |
| Specific gravity at 77° F | | | | | | 1.005 |

A large number of salts, including many in addition to those indicated in Tables I, II and III above, were tested in the same manner as the antimony chloride in Example 2 above, using in each case a quantity of salt tested which was chemically equivalent to (the equivalent weight of) 1% by weight of $FeCl_3.6H_2O$ in the RC—2 cutback, and it was found that a large number of other salts were active to strengthen the bond between the asphalt and the hydrophilic aggregate against the deteriorating action of water and that a large number of salts were relatively inactive for the purpose of this invention. The results of these tests which further exemplify this invention are shown in the following table:

Table VII

| Salt tested (equivalent weight in RC-2 cutback of 1% by weight of $FeCl_3.6H_2O$) | Proportion of aggregate coated after test | Salt tested (equivalent weight in RC-2 cutback of 1% by weight of $FeCl_3.6H_2O$) | Proportion of aggregate coated after test |
|---|---|---|---|
| | Percent | | Percent |
| Antimony chloride | 100 | Manganese acetate | 20 |
| Ferric oxalate | 100 | Nickel sulfate | 20 |
| Lead acetate | 95 | Zinc chloride | 20 |
| Silver nitrate | 95 | Calcium chloride | 15 |
| Cobalt chloride | 90 | Ferrous sulfate | 10 |
| Ferric chloride | 90 | Aluminum acetate | 10 |
| Tin chloride | 90 | Bismuth nitrate | 10 |
| Ferrous chloride | 90 | Ferric acetate, basic | 10 |
| Antimony sulfate | 80 | Lead chloride | 10 |
| Coppes chloride | 80 | Manganese sulfate | 10 |
| Ferric nitrate | 80 | Manganese nitrate | 10 |
| Mercuric chloride | 80 | Aluminum nitrates | 5 |
| Zinc nitrate | 75 | Aluminum phosphates | 5 |
| Copper nitrate | 60 | Aluminum hydroxide | 5 |
| Mercuric sulfate | 60 | Bismuth carbonate | 5 |
| Aluminum chloride | 50 | Cobalt acetate | 5 |
| Cobalt chromate | 50 | Ferric sulfate | 5 |
| Manganese chloride | 50 | Ferric phosphate | 5 |
| Mercuric nitrate | 50 | Ferric chromate | 5 |
| Titanium chloride | 50 | Ferric hydroxide | 5 |
| Copper acetate | 30 | Ferric carbonate | 5 |
| Mercuric acetate | 30 | Lead sulfate | 5 |
| Mercurous nitrate | 30 | Manganese phosphate | 5 |
| Nickel chloride | 30 | Manganese carbonate | 5 |
| Zinc sulfate | 30 | Mercurous chloride | 5 |
| Aluminum sulfate | 20 | Mercurous sulfate | 5 |
| Bismuth chloride | 20 | Silver chloride | 5 |
| Copper sulfate | 20 | Silver sulfate | 5 |
| Ferric sulfate | 20 | | |
| Lead nitrate | 20 | | |
| Magnesium chloride | 20 | | |

The data in Table VII above show the results obtained by using the respective salts named in the bituminous material in proportion chemically equivalent to 1% by weight of $FeCl_3.6H_2O$ or to 0.60% of $FeCl_3$. These results compare each salt with a chemically equivalent proportion of $FeCl_3.6H_2O$, which is found to be a more economically advantageous salt to use for the purpose of this invention, since it has the advantage of being both readily available and comparatively cheap. With further tests it is found, however, that some of these salts which appear from Table VII to be relatively inactive for the purpose of this invention are effective when added in larger proportion, and others are still relatively inactive for the purpose of this invention even when the proportion thereof is increased. The results of these tests are indicated in the following table:

Table VIII

| Salt tested | Proportion of aggregate coated after test | |
|---|---|---|
| | Salt chemically equivalent to 1% by weight of $FeCl_3.6H_2O$ | Salt chemically equivalent to 3% by weight of $FeCl_3.6H_2O$ |
| Aluminum chloride | 50 | 75 |
| Zinc chloride | 25 | 90 |
| Ferric sulfate | 20 | 75 |
| Ferric acetate, basic | 10 | 30 |
| Ferrous sulfate | 10 | 75 |

From the results obtained, as indicated in Table VIII above, it appears that by increasing the proportions of aluminum chloride, zinc chloride and ferric sulfate, the effectiveness of each for the purpose of this invention is increased, although to different degrees. These three salts are water-soluble. Basic ferric acetate, which is relatively water-insoluble, showed some increase in effectiveness upon an increase in proportion added, but even when such a relatively large proportion as the chemical equivalent of 3% by weight of $FeCl_3.6H_2O$ was added, the results were not as satisfactory as with the ferric chloride, for example.

Many metal salts are especially active for the purpose of this invention, but some are relatively poor in their effectiveness. This invention is based on a generic discovery, however, and hence, in a broad sense this invention contemplates the addition to the bituminous material itself of an agent which is active to strengthen the bond between a hydrophilic aggregate and the bituminous substance against the deteriorating action of water when such aggregate is coated therewith.

These agents are to be added directly to the bituminous material, or an aqueous solution of such agent may be added directly to the bituminous material. Those salts which are particularly effective for the purpose of this invention are the water-soluble heavy metal salts active to strengthen the bond between a bituminous material and a hydrophilic aggregate against the deteriorating action of water. Moreover, those salts which are the best for the purpose of this invention are the water-soluble and substantially oil-insoluble heavy metal salts active to strengthen the bond between a bituminous material and a hydrophilic aggregate against the deteriorating action of water. For example, ferric chloride is more effective than aluminum chloride, and ferric chloride is substantially oil-insoluble as compared to aluminum chloride which is considerably oil-soluble. As noted above, the agents effective for the purpose of this invention are active in various degrees corresponding to the various proportions added, although some are relatively ineffective substantially regardless of the proportion added to the bituminous material. However, from this disclosure numerous equivalents will readily suggest themselves to those skilled in the art to which this invention relates and also with this disclosure they can, by a very simple experiment, for example, by the test disclosed herein, readily determine whether a particular agent or salt is active to strengthen the bond between a bituminous material and a hydrophilic aggregate. Therefore, as pointed out above, this invention is directed to not only the specific salts herein disclosed to be effective for the purpose of this invention in the novel combination of this invention, but includes also the addition directly to the bituminous material of any agent active to strengthen the bond between a hydrophilic aggregate and the bituminous material, particularly the water-soluble heavy metal salts which are so active, and more particularly the water-soluble and oil-insoluble group of such salts.

Although in the disclosure above use of this invention in connection with the surfacing of highways has been mentioned by way of example, the invention has many other uses, such as coating hydrophilic objects other than mineral aggregate, for example, paper, wood, brick, glass, fibrous material, etc. The invention also has special utility when a bituminous material, such as asphalt, treated as disclosed herein, is used to make up a cementitious asphaltic composition, as by incorporating a filler or fibres into such asphalt, and this cementitious material is used to stick glass fronts to the wall of a building, for example. It is also useful for obtaining adhesion between a layer of asphalt composition and a surface which is hydrophilic, for example, between a brick pavement and an asphalt composition surfacing, in which case the aggregate or filler in this asphalt composition may or may not be hydrophilic. Numerous other uses will be apparent to those skilled in the art.

It is to be understood that the term "heavy metal" is used to include all those metals not alkali metals or alkaline earth metals and that this term "heavy metal" includes aluminum.

In the disclosure of my invention reference is made to specific examples to illustrate the best ways known of making and using it; however, the invention sought to be protected by Letters Patent of the United States is not to be construed to be limited to the specific details of such examples, but includes variations and modifications within the scope and extent of the appended claims.

I claim:

1. The process of greatly improving the adhesiveness of a bituminous material for mineral hydrophilic substances which comprises dispersing an aqueous solution of an agent into unemulsified bituminous material free from added saponifiable and saponified material, thereby forming a water-in-oil type bituminous emulsion in which said aqueous solution is in the dispersed phase and said bituminous material is in the continuous phase, said water-in-oil type emulsion being formed without the formation of any intervening oil-in-water type emulsion, said agent consisting of a relatively water-soluble and oil-insoluble heavy metal salt in an amount sufficient substantially to improve said adhesiveness.

2. The process of claim 1 in which said agent is a relatively water-soluble and oil-insoluble iron salt.

3. The process of claim 1 in which said agent is ferric chloride.

4. The process of claim 1 in which said hydrophilic substance is a mineral aggregate.

5. A bituminous material having an increased adhesiveness for mineral hydrophilic substances comprising an aqueous solution of an agent emulsified into a bituminous material free from added saponifiable and saponified material in the form of a water-in-oil type emulsion, said aqueous solution being in the dispersed phase and said bituminous material being in the continuous phase, and said water-in-oil type emulsion being formed without the formation of any intervening oil-in-water type emulsion and said aqueous solution of said agent serving as the emulsifying medium, and said agent consisting of a relatively water-soluble and oil-insoluble heavy metal salt in an amount sufficient both to form said water-in-oil emulsion and to improve said adhesiveness.

6. The bituminous material of claim 5 in which said agent consists of a relatively water-soluble and oil-insoluble iron salt.

7. The bituminous material of claim 5 in which said agent consists of ferric chloride.

8. A bituminous composition comprising a mineral hydrophilic substance coated with a bituminous material, the bond between said hydrophilic substance and said bituminous material being secure against the deteriorating action of water, said bituminous material being in the form of a water-in-oil dispersion in which said bituminous material is in the continuous phase and the dispersed phase is an aqueous solution of a relatively water-soluble and oil-insoluble heavy metal salt in an amount sufficient both to form the dispersion in the absence of added saponifiable and saponified material and to improve the adhesiveness of the bituminous material for the mineral hydrophilic substance.

9. The bituminous composition of claim 8 in which the dispersed phase is an aqueous solution of ferric chloride.

10. A process of making a bituminous composition of a mineral hydrophilic substance and a bituminous material free from added saponifiable and saponified material which comprises coating said mineral hydrophilic substance with said bituminous material and improving the adhesiveness of said bituminous material for said hydrophilic substance by dispersing in discontinuous phase throughout said bituminous material a relatively water-soluble and oil-insoluble heavy metal salt in an amount sufficient to strengthen the bond between said hydrophilic substance and said bituminous material against the deteriorating action of water, a sufficient proportion of said water-soluble oil-insoluble heavy metal salt being present in said bituminous material in unreacted form to improve said adhesiveness, and the hardness of said bituminous material containing said salt not being substantially affected by the presence thereof.

11. The process of claim 10 in which said agent is a relatively water-soluble and oil-insoluble iron salt.

12. The process of claim 10 in which said agent is ferric chloride.

13. The process of claim 10 in which said hydrophilic substance is a mineral aggregate.

14. The process of claim 10 in which said bituminous material is asphalt.

PAUL E. McCOY.